Oct. 19, 1948.  E. P. SMITH  2,451,989

MOTOR REVERSING CONTROL SYSTEM FOR VALVES

Filed May 3, 1944

Inventor
EDWARD P. SMITH
Attorney

Patented Oct. 19, 1948

2,451,989

UNITED STATES PATENT OFFICE 2,451,989

MOTOR REVERSING CONTROL SYSTEM FOR VALVES

Edward P. Smith, Mansfield, Ohio, assignor to The Ohio Brass Company, Mansfield, Ohio, a corporation of New Jersey Application May 3, 1944, Serial No. 533,967

10 Claims. (Cl. 318—266)

My invention relates to the operation of valves and particularly valves of large size and subject to relatively high fluid pressure as encountered in connection with cross-country pipe lines.

One object of my invention is to provide means for operating a valve to either its open or its closed positions with the least possible manual effort.

Another object of my invention is to provide means to operate the valve to either its open or its closed positions from a station remote from the valve.

Another object of my invention is to provide an electrical system for operating a valve from a station remote from the valve.

Still another object of my invention is to provide an electric system to operate a valve in which the operation of the system is controlled from a point remote from the valve, and whereby the pilot or control valve for the main valve may be moved to either its open or its closed positions and returned to its neutral or normal position after each opening and closing operation.

Another object of my invention is to provide a remote control electrical system to operate a valve and which includes means to indicate a fault on the control circuit.

A still further object of my invention is to provide a remote control system for the operation of a valve in which alternating current is the motive power.

And a still further object of my invention is to provide a remote control system in which a fault upon the control circuit will not effect an operation of the connected device.

A still further object of my invention is to provide means whereby a pair of relays connected by a common control circuit to a source of power may be selectively operated.

Further objects and features of the invention will be readily apparent to those skilled in the art from the following specification and the appended drawing illustrating certain preferred embodiments of the invention.

In cross-country or transcontinental pipe lines carrying gas and oil, relatively high pressures are used. The valves placed along the line to control the flow of fluid therein are correspondingly large. These valves may be of the taper plug type or of the reciprocating or rotating piston type. In any of the types the friction is very great due to the large cooperating bearing surfaces and the very high fluid pressure. Many of these valves are opened and closed by an electric motor.

It is often necessary to dispatch an operator over a long distance to these valves to open or close the same which means considerable delay, inconvenience and expense; especially is the delay serious if a break occurs in the line.

In order to overcome these disadvantages I have devised a system whereby the operation of the valve may be effected from a station remote to the valve and such operation effected immediately upon knowledge at the station that there is trouble on the pipe line.

I have disclosed an electrically operated system controlled from a station remote to the valve in my U. S. Patent No. 2,354,888, issued August 1, 1944. In my present application, however, I describe and show a modified and simplified system.

While my improved system is applicable to valves of various types, I have shown it as applied to a reciprocating piston type valve as disclosed in U. S. Patent 2,326,398 issued August 10, 1943, to Homer J. Shafer.

Figure 1:
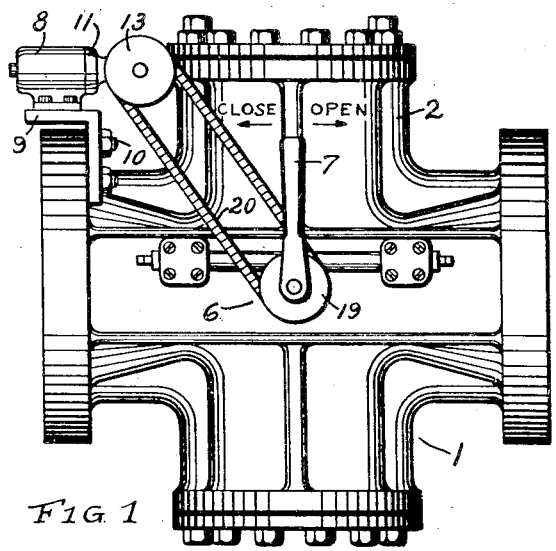
Fig. 1 is a front view in elevation of a valve forming a part of my invention.
Figure 2:
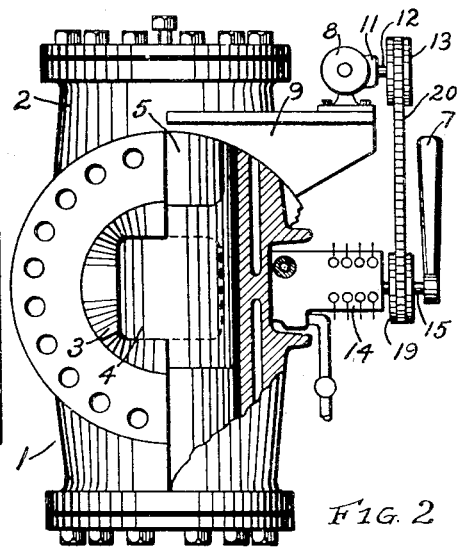
Fig. 2 is an end view in elevation and partial section of Fig. 1.

In a preferred embodiment of my invention the valve 1 shown in Figs. 1 and 2 comprises a body 2 provided with a passage 3 therethrough and a reciprocating piston 4 having a passage 5, to open and close the passage 3 to the flow of the fluid therethrough.

The piston 4 is reciprocated by means of the pressure of the fluid in the line and is controlled by the pilot valve 6 which is operable manually at the valve by the handle 7 or by the motor 8 from a remote station.

The pilot valve 6 is a three-way valve and is so constructed and related to the valve proper that fluid under pressure flows to the pilot valve and from there to either end of the valve body 2 to act upon the end of the piston 4, depending upon whether it is desired to move the piston 4 to its open or to its closed position.

The pilot valve 6 has three positions, namely, two positions for operating the piston to either its open or its closed position and an intermediate or neutral position to which position the pilot valve must be returned after each operation of the piston 4. Full disclosure of the construction and operation of the valve shown in Figs. 1 and 2 is given in the Letters Patent named above.

Associated with the valve 1 is a single phase motor 8 of the reversing capacitor type. This motor may be mounted upon the valve body 1 by means of a bracket 9, or other suitable means, and secured thereto by the bolts 10.

The motor is shown as having a speed changer 11 with a projecting shaft 12, upon which is mounted the chain wheel 13 to be rotated thereby.

Associated with the pilot valve 6 is a cam and switch box 14. Through this box extends the projecting shaft 15. The inner end of the shaft 15 is arranged to operate the pilot valve 6 and to the outer end is secured the handle 7. Within the box 14 is a set of cams 16, 17 and 18 mounted upon the shaft 15 to rotate therewith.

Also mounted upon the shaft 15 is a chain wheel 19 to rotate the shaft 15. The chain wheels 13 and 19 are connected by the chain 20, the latter wheel driven by the former.

In place of a speed changer 11, a very small chain wheel 13 may be used directly upon the motor shaft and a much larger chain wheel on the shaft 15.

Figure 3:
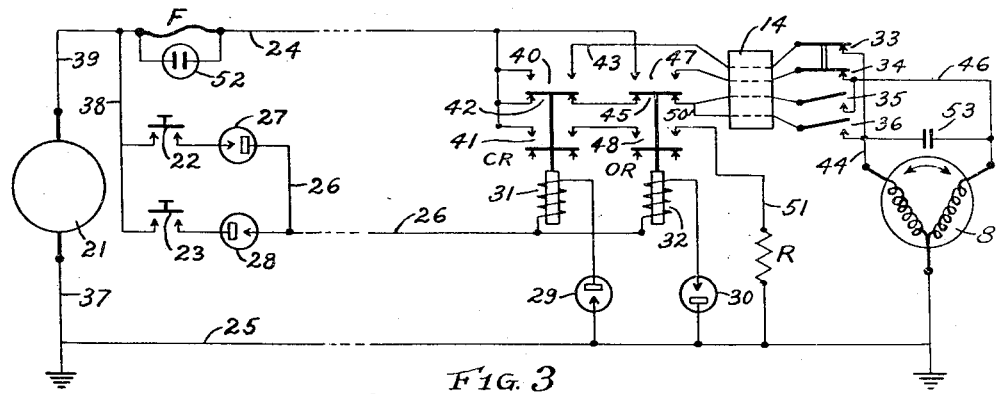
Fig. 3 is a wiring diagram forming another part of my invention.

The operating company may have its own source of power but more likely it will secure power for operating the system from the lines of a public utility company. In Fig. 3 the system is shown as receiving power from its own generator 21.

In the system disclosed in my U. S. Patent No. 2,354,888, issued August 1, 1944, I employ only one push-button to control the operation of the valve to both its open and closed positions. Successive operations of the control button in that system effected alternate operations of the pilot valve by means of an impulse relay. This arrangement required only one control wire to govern both the opening and the closing operations of the valve. While this system is entirely practical and operative, I have found it desirable to have a system using two push-buttons, one to control the closing and the other to control the opening, of the valve, a much simpler system to operate.

To accomplish this result I make use of rectifiers in series with control relays and push-buttons. The rectifiers may be of the mercury tube or the vacuum tube or the dry disc (copper oxide) type of which I prefer the latter.

Referring to Fig. 3, the alternating generator 21 is preferably located at the control station together with the control push-buttons 22 and 23. In place of the generator 21, the wires from a power supply company may be brought into the station for the operation of the system.

The source of power is connected to the power lines 24 and 25 which extend from the control station to the motor 8 at the valve which may be many miles away.

The normally open push-buttons 22 and 23 are connected to the supply line 24 and to the control line 26. Interposed between each push-button 22 and 23 and the control line 26 is a rectifier 27 and 28 respectively.

The rectifier 27 permits only the positive half cycles of voltage or current to the control line when the button 22 is closed and the rectifier 28 permits only the negative half cycles of voltage or current to the control line 26.

Relay switches CR and OR are operated only by negative and positive half cycles of current respectively; this is due to the rectifiers 29 and 30 connected to the operating coils 31 and 32 respectively of the relays OR and CR which allow negative half cycles of current through coil 31 and positive half cycles of current through coil 32.

When push-button 22 is closed only positive half cycles of current energize coil 32 and when push-button 23 is closed only negative half cycles of current energize the coil 31, thus both relays CR and OR are controlled over a single wire 26 by separate push-buttons.

Figure 4:
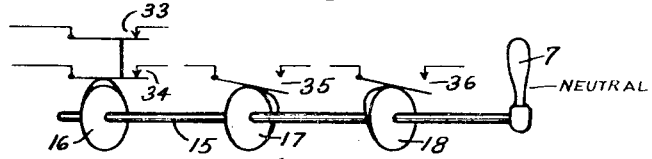
Figs. 4, 5 and 6 are schematic diagrams showing three positions of cam elements and switches forming parts of my invention, as fully described hereinafter.

When the valve handle 7 is in the neutral or normal position the valve 1 may be either closed or open and the limit switches 33, 34, 35 and 36 (in Fig. 3), which are positioned in the cam and switch box 14 and operated by the cams 16, 17 and 18 (see Figs. 4, 5 and 6), will be in the condition shown in Figs. 3 and 4 and which may be referred to as their normal positions since between the opening and closing positions of the pilot valve 6 and of the line valve 1, the pilot valve 6 is always in its neutral position.

Figure 5:
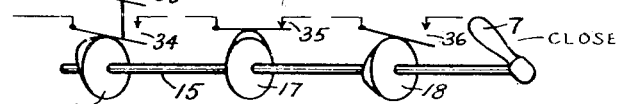
Figure 6:
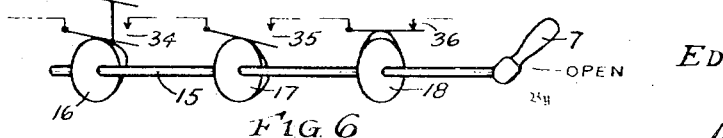

It must be understood that Fig. 3 is schematic and that the limit switches 33, 34, 35 and 36 are positioned in the cam and switch box 14 which is associated with the pilot valve 6 (see Fig. 2) and operated by the cams 16, 17 and 18 therein (see Figs. 4, 5 and 6).

Switches 33 and 34 are mechanically connected to act in unison.

Suppose now the valve 1 is open and it is desired to close the valve from the station several miles away. The operator will press the button 23 and the negative half cycle of current will flow from the source of power through the circuit comprising conductors 37 and 25, and on account of the rectifiers 29 and 28, through the coil 31 of relay CR, conductor 26, switch 23 conductors 38 and 39. This will energize the coil 31 and operate the relay CR to close the relay contacts 40 and 41 and open contacts 42.

A circuit will now be established from the source of power to the motor 8 through conductor 39, fuse F, conductor 24, contacts 40, conductor 43, limit switch 33, conductor 44, motor 8, conductors 25 and 37. This will energize the motor and its rotor will rotate counter-clockwise which in turn will rotate the cams and pilot whereby fluid under pressure will be admitted to one end of the valve 1 moving the piston 4 to its closed position and the cams to the position shown in Fig. 5 whereby the limit switches 33, 34, 35 and 36 assume the condition shown in Fig. 5 in which switches 33, 34 and 36 are open and 35 now closed.

Rotation of the rotor of the motor counter-clockwise will continue as long as switch 23 is closed maintaining relay CR closed and until the cam 16 opens limit switch 33 thus opening the circuit to the motor.

It will be understood that the construction and relation of the cams 16, 17 and 18 to the limit switches 33, 34, 35 and 36 will be such that the opening and closing of the switches will synchronize with the movements of the pilot valve, Figs. 4, 5 and 6 being schematic and illustrative only.

After the valve 1 is closed and the limit switches and cams assume the positions of Fig. 5, the motor will automatically stop and no further action takes place until the switch 23 is released to its open position. This de-energizing relay coil 31 and the relay switch assumes the condition shown in Fig. 3 in which contacts 40 and 41 are now open and contacts 42 closed. As previously stated limit switch 35 is closed (see Fig. 5) and we now have a circuit from the source of power through the conductor 39, fuse F, conductor 24, contacts 42 and 45, limit switch 35 (which is closed), conductor 46 to motor 8, conductors 25 and 37. This will energize the motor 8 to rotate clockwise which in turn will rotate the cams.

The rotation of the rotor of the motor clockwise will continue until the cam 17 opens the limit switch 30 as shown in Figs. 3 and 4 at which time the motor will automatically stop with the rotor in its neutral position with the limit switches in the condition shown in Figs. 3 and 4 and the pilot valve in its neutral position, the entire system now being in normal condition for another operation of the valve.

The valve 1 is now closed and the switches, cams and relays in their normal conditions as in Figs. 4 and 3 and the pilot valve in its neutral position.

If it is now desired to open the valve, the operator will close switch 22 which due to rectifiers 27 and 30 and for reasons previously stated permits energizing only coil 32 of relay OR although both relays OR and CR are connected to the contact wire 26.

Operation of relay OR closes contacts 47 and 40 and opens contacts 45. With switches 22 still closed a circuit is now established from the source of power through contacts 39, fuse F, conductor 24, contacts 47, limit switch 34, conductor 46, motor 8, conductors 25 and 37 to source of power. This energizes the motor 8 to operate clockwise which in turn will rotate the cams 16, 17 and 18 and pilot valve 6 to admit fluid into the valve 1 to open the same.

The rotation of the rotor of the motor clockwise will continue until the limit switch 34 opens which will be after the cam 16 has rotated clockwise a sufficient amount, as shown in Fig. 6, from its normal or neutral position of Fig. 4.

To return the cams, limit switches, relays and pilot valve to their normal conditions as shown in Figs. 3 and 4, the operator releases the switch 22 thereby de-energizing the coil 32 of relay OR whereby the relay returns to its normal position of Fig. 3, and thereby opening contacts 47 and 48 and closing contacts 45.

The limit switches 33, 34, 35 and 36 which are now in the condition shown in Fig. 6 provide a circuit from the source of power through conductor 39, fuse F, conductor 24, contacts 42 and 45, conductor 50, limit switch 36 (see Fig. 6), conductor 44, motor 8 and conductors 25 and 37 whereby the rotor of the motor 12 will be energized and rotated anti-clockwise until the cams and limit switches have reached their neutral or normal conditions shown in Figs. 3 and 4 and the rotor has reached its neutral position thus opening limit switch 36 and de-energizing motor 8.

I have shown the circuit grounded but that is because most commercial power lines are grounded on one side or the neutral; the grounding however has no effect upon the operation of my invention and forms no part thereof.

Should line 24 connect with line 26 through accident, control line 26 will be energized with alternating current from the source of supply. This would cause both relays OR and CR to function, establishing a circuit from line 24 through contacts 40 and 47 to motor 8 and then to line 25.

To prevent damage from such a condition I insert fuse F in line 24 and connect contacts 41 and 48 to line 25 thus establishing a low resistance connection from line 24 to line 25 by way of contacts 41 and 48. To prevent a too heavy flow of current through line 51 and thereby endanger welding the contacts 41 and 48 to their connecting base I insert resistance R in the line 51, sufficient to reduce the current but not to prevent blowing the fuse F to protect the system.

I place across the terminals of the fuse an indicator such as a neon tube 52 to appraise the station operator of troubles on the system.

If it is desired to operate two valves simultaneously along the pipe line, the conductors 24, 26 and 25 may be extended to the second valve.

The condensor 53, connected across the terminals of the capacitator motor form a part thereof.

If desired the rotary type of motor may be replaced by a reciprocating type.

Having disclosed and described my invention, what I claim as my invention is:

1. A control system for a pipe line valve, comprising in combination, an electric motor operable in two directions, circuit means to connect the motor to a source of alternating current, the circuit means including a plurality of limit switches to limit the movement of the motor when the motor has rotated in the said two directions a predetermined amount, a pair of electrically operable relay switches to selectively effect energization of said circuit means and limit switches, a single control circuit, operating coils for the relay switches connected to and energized when the control circuit is energized, means to selectively energize the control circuit whereby the relay switches will be selectively energized, the last said means comprising a pair of normally open manually closable switches each independently connecting the said single control circuit to the source of power to energize the control circuit and rectifying means included in said control circuit whereby only one relay switch will operate at a time depending upon which normally open switch is closed, safety means to open the circuit means should a short-circuit occur between the control circuit and one of the other circuits whereby both relay switches would operate simultaneously, the said safety means comprising a circuit of predetermined resistance closed by the simultaneous operation of both relays whereby a limited current will flow through last said circuit and means to open the last said circuit as a result of said limited current.

2. A control system comprising a reversible motor having three positions, a neutral position intermediate two other positions, four limit switches connectable to the motor to control the rotation of the motor, three cams operated by the motor to open and to close the limit switches whereby the rotation of the motor is automatically checked when the three positions are reached, a pair of relay switches connected to the limit switches and to a source of alternating current and arranged to control the direction of rotation of the motor to said three positions, operating means for each relay switch connected to the source of power, a control circuit including a pair of normally open manually operable control switches connected to the source of current and a single conductor connecting both control switches to both relay operating means and rectifying means included in series with each control switch and with each relay operating means whereby selective operation of the relay switches are effected depending upon the desired direction of rotation of the motor from its neutral position and upon which control switch is closed, the relay switches operating to automatically effect the return of the motor to its neutral position when the control switch is released and the relay switch returned to its normal position.

3. An electric control system adapted to operate and control the operation of a pilot controlled line valve comprising, a reversible motor, a plurality of cams operable by the motor in predetermined timed relation to each other, a plurality of limit switches connected to the motor and operable by the cams to their open and closed positions to limit the directional rotation of the rotor of the motor, a pair of relay switches connected to the limit switches, the relay switches and motor connected to a source of alternating current whereby the relay switches may be operated to selectively energize the motor, a normally open control circuit connected between the mains of said source of current and including the operating coils of the relay switches and a pair of normally open manually operable control switches to separately effect energization of the control circuit and operating coils for each of the relay switches, and means included in said control circuit in series with the control switches and the relay operating coils to selectively control the operation of the relay switches depending upon which control switch is closed.

4. An electric system to operate and control the opening and closing of a pilot operated valve comprising, a reversible motor, circuit means connected to a source of power and to the motor to effect operation of the motor, the circuit means including a pair of relay switches to control the direction of operation of the rotor of the motor from a neutral positon depending upon which relay switch is operated, a separate control circuit connected to the source of power, a pair of independently operable normally open control switches included in the control circuit, operating means for each relay switch included in the control circuit, the control circuit connecting both operating switches to both relay operating means, means included in the control circuit to selectively control the energization of the relay operating means to effect the operation of one or the other relay switch depending upon which control switch is closed, the relay switches being arranged to automatically return the rotor of the motor to its neutral position when the closed operating switch is opened, a plurality of limit switches included in the circuit means to limit the operation of the said rotor in either direction from its neutral position and to check its movement when it reaches its neutral position and means operated by the motor in unison therewith to actuate the limit switches to their open and closed positions in synchronism with the movements of the motor.

5. A control system for a pilot controlled valve comprising, a rotatable motor of which the rotor has normally a neutral position and movable in each direction from the neutral position, circuit means including the motor to effect operation of the motor, the circuit means including a pair of relay switches to control the operation of the rotor of the motor in the two said directions from its normal position and effect a return of the said rotor to its neutral position, limit switches included in the circuit means and operated by the motor to check the operation of the rotor when it has moved in said directions a predetermined amount and the rotor returned to its neutral position, a control circuit connected to the source of power, an operating means for each relay switch, a pair of normally open control switches, the control circuit connecting both relay operating means to both control switches and rectifying means included in the control circuit to effect selective energization of the relay switches depending upon the desired direction of operation of the motor and the control switch closed, the relay switches and their operating means and the limit switches and motor being so related and connected that the motor will be retained in its neutral position while the control switches are open.

6. A control system for a pilot operated valve, comprising a motor electrically operable in two directions from a neutral position, circuit means connectable to a source of alternating current and to the motor to energize the motor, the circuit means including a single control circuit connectable across the source of power, a normally open manually operable switch to control the operation of the motor in one direction from its neutral position and a second normally open manually operable switch to control the operation of the motor in the other direction from its neutral position, each switch when closed effecting energization of the control circuit, a pair of relay switches each having an operating coil included in the single control circuit and each relay switch arranged to effect the operation of the motor in one of the said directions of operation, rectifying means included in the single control circuit to effect the selective energization of the proper relay coil depending upon the desired direction of operation of the motor and upon which manually operable switch is closed, a plurality of limit switches arranged to connect the relay switches to the motor, and cam means associated with the limit switches to open and close the limit switches in predetermined sequence whereby current to said motor will first rotate the same in one direction or the other from its neutral position depending upon which relay switch is selectively operated and then operate the motor in the opposite direction until it reaches its neutral position upon the opening of the manually operated switch.

7. Remote control means for a line valve comprising in combination, a single phase capacitor motor the rotor of which is operable in two directions from a neutral position, circuit means including a pair of relay switches arranged to selectively connect said motor to a source of alternating current, a plurality of limit switches included in said circuit means to control the direction of operation of the motor and return its rotor to its neutral position after operation in either direction, a pair of normally open switches included in the circuit, means at a point remote from the motor to selectively control the energization of the said relay switches, and rectifying means included in the circuit means on each side of the said relay switches thereby selectively impressing directly upon the circuit means and upon the said relay switches either the positive half cycles or the negative half cycles of said alternating current depending upon which normally open switch is closed, whereby the direction of rotation of the rotor and operation of the control means will be responsive to the energization of the circuit means.

8. A control system comprising in combination, a source of alternating current, an electric motor the rotor of which is operable in two directions, circuit means connecting the motor to the source of alternating current, the circuit means including a plurality of limit switches to limit the movement of the rotor when it has rotated a predetermined amount in each direction from its neutral position, a control circuit connected to the said source of power, a pair of electrically operated relay switches to selectively effect energization of the limit switches, an operating coil for each relay switch connected to the control circuit and energized thereby when the control circuit is energized, means to selectively energize the control circuit whereby the relay switches will be selectively energized, the last said means comprising a pair of normally open manually closable switches each independently connecting the control circuit to the source of power to energize the control circuit and rectifying means interposed in the control circuit between each said normally open switch and directly connected to both relay operating coils and other rectifying means associated with each relay coil whereby only one relay switch will operate at a time depending upon which normally open switch is closed, means to open at least one of said circuits in case of overload and means affected by the opening of the circuit to indicate such opening.

9. In an electric control system arranged to operate a pilot valve having a normally closed position movable to an open position on either side of its normally closed or neutral position, to effect the opening and closing of a line valve, in combination, a reversible electric motor having a neutral position, a plurality of cams operable by the motor, a plurality of limit switches operable by the cams to their open and closed positions in predetermined timed relation to each other, circuit means connecting the limit switches to the motor and to a source of alternating current whereby the motor may be energized, the said circuit means including a pair of relay switches provided with separate actuating means whereby the operation of one relay will effect energization of the motor to actuate its rotor in one direction and the operation of the other relay will effect energization of the motor to actuate its rotor in the other direction, a single control wire connecting both relay operating means to the source of power to effect the energization of the relays, a pair of manually closable switches to effect energization of the control wire and selective energization of the relay actuating means when either manual switch is closed, rectifying means in series with each manual switch and with each relay operating means whereby positive half cycles and negative half cycles of current may be impressed upon the control wire and the relay operating means depending upon which manual switch is operated to selectively energize the relay actuating means and close the relays whereby the said rotor will accordingly rotate in one direction or the other, the limit switches operating to limit the rotation of the rotor in each direction when it has rotated a predetermined amount in either direction and effect a return of the rotor to its neutral or stationary position after each operation of the motor.

10. In a remote control system for a reciprocating valve, in combination, an electrically operable motor having a rotor operable in either direction from a neutral position, reciprocating means operable by the motor, a plurality of cams operable by the motor, a plurality of limit switches to control the actuation of the motor in either direction from its neutral position and return it to its neutral position, the limit switches arranged to be opened and closed by the cams in predetermined relation, a pair of electrically operated relay switches to effect electric energization of the limit switches, circuit means connecting the motor and limit and relay switches to each other and to a source of current, a control circuit operating coils for the relay switches connected in series parallel relation in the control circuit, normally open manually operable control switches connected in series parallel relation in the control circuit and in series with the said coils, rectifying means connected in series with each control switch and other rectifying means connected in series with each relay operating coil to selectively energize the control circuit and the relay operating coils depending upon which manually operable switch is closed and the desired direction of rotation of the rotor from its neutral position, the relay switches operating to automatically effect return of the rotor to its neutral position when the control switch is released and the relay switch returned to its normal position.

EDWARD P. SMITH.

REFERENCES CITED

The following references are of record in the file of this patent:

UNITED STATES PATENTS

| Number | Name | Date |
|---|---|---|
| 719,768 | Engberg | Feb. 3, 1903 |
| 852,539 | Buchanan | May 7, 1907 |
| 1,821,514 | Hintz | Sept. 1, 1931 |
| 1,931,771 | Pinkerton | Oct. 24, 1933 |
| 2,085,086 | Drake | June 29, 1937 |
| 2,119,061 | Stein | May 31, 1938 |
| 2,150,117 | Griffith | Mar. 7, 1939 |
| 2,293,809 | Dodd | Aug. 25, 1942 |
| 2,354,888 | Smith | Aug. 1, 1944 |
| 2,362,710 | Miskelly | Nov. 14, 1944 |

FOREIGN PATENTS

| Number | Country | Date |
|---|---|---|
| 418,081 | Great Britain | Oct. 18, 1934 |